United States Patent
Vanha et al.

(10) Patent No.: US 7,713,772 B2
(45) Date of Patent: May 11, 2010

(54) MICROMECHANICAL FLOW SENSOR WITH TENSILE COATING

(75) Inventors: Ralph Steiner Vanha, Zürich (CH); Tommasso Francesco Cilento, Emmenbrücke (CH)

(73) Assignee: Sensirion AG, Stafa (CH)

( * ) Notice: Subject to any disclaimer, the term of this patent is extended or adjusted under 35 U.S.C. 154(b) by 670 days.

(21) Appl. No.: 11/542,875

(22) Filed: Oct. 3, 2006

(65) Prior Publication Data
US 2007/0231942 A1   Oct. 4, 2007

Related U.S. Application Data

(63) Continuation-in-part of application No. 10/466,026, filed on Mar. 19, 2004, now Pat. No. 7,154,372.

(30) Foreign Application Priority Data
Jan. 10, 2001   (CH) ......................................... 31/01

(51) Int. Cl.
*H01L 21/00*   (2006.01)
(52) U.S. Cl. ................. 438/53; 73/723; 73/514.34; 73/777; 73/790; 438/48
(58) Field of Classification Search ............ 73/723, 73/725, 726, 514.34, 790; 438/53; 338/22 SD, 338/45
See application file for complete search history.

(56) References Cited

U.S. PATENT DOCUMENTS

| | | | | |
|---|---|---|---|---|
| 5,332,469 A * | 7/1994 | Mastrangelo | ................ | 216/2 |
| 5,393,351 A * | 2/1995 | Kinard et al. | ............... | 136/225 |
| 5,654,244 A * | 8/1997 | Sakai et al. | ................... | 438/53 |
| 2001/0021581 A1 * | 9/2001 | Moon et al. | ................ | 438/637 |
| 2002/0142478 A1 * | 10/2002 | Wado et al. | ................ | 436/151 |
| 2003/0019290 A1 * | 1/2003 | Iwaki et al. | ............... | 73/204.26 |

OTHER PUBLICATIONS

MEMS Design and Fabrication, ed. By M. Gad-el-Hak, p. 2-10, line 11 from the bottom.
Handbook to Semiconductor Manufacturing Technology, ed. By Y. Nishi and R. Doering, p. 319, left column, third line after the title of section C.
Fundamentals of Microfabrication, M.J. Madou, p. 302, Table 5.16, col. title "LTD", last row.
Nanotechnology, ed. by B. Bhushan, p. 305, right col. lines 8 and 9 of second paragraph.

* cited by examiner

*Primary Examiner*—A. Sefer
*Assistant Examiner*—Allen L Parker
(74) *Attorney, Agent, or Firm*—Cooper & Dunham LLP

(57) ABSTRACT

A sensor integrated on a semiconductor device (1), in particular a flow sensor, comprises a measuring element (2) on a membrane (5). In order to prevent a buckling of the membrane (5) a tensile coating (9) is applied. The coating covers the membrane, but it preferably leaves all the active electronic components integrated on the semiconductor chip (1) uncovered, such that their electrical properties are not affected.

14 Claims, 3 Drawing Sheets

MICROMECHANICAL FLOW SENSOR WITH TENSILE COATING

CROSS REFERENCE TO RELATED APPLICATIONS

This application is a Continuation-in-part (CIP) of application Ser. No. 10/466,026, filed Mar. 19, 2004 now U.S. Pat. No. 7,154,372, the disclosure of which is incorporated by reference.

BACKGROUND OF THE INVENTION

The invention relates to a sensor according to the preamble of claim 1 as well as to a method of its production.

Sensors of this type are e.g. flow or temperature sensors, where at least a part of the measuring element is arranged on a membrane. This membrane has often a thickness of a few micrometers only and spans an opening or recess in the semiconductor device.

Preferably, further active electronic components are integrated on the semiconductor device of sensors of this type, such as transistors for amplifiers or reference voltage sources.

The membrane is usually formed by the layers deposited during the production of the circuit, wherein the semiconductor below the layers is etched away. The layers that are deposited in most of the conventional production processes, are, however, usually under compressive stress, i.e. pressure forces are acting within the plane of the layer, e.g. because the layers were applied at elevated temperatures and contracted less than the substrate while cooling down. The magnitude of the compressive stress depends on the manufacturing process and on the layer structure of the membrane. This compressive stress can lead to an undesired buckling of the membrane, which renders it mechanically unstable.

SUMMARY OF THE INVENTION

Hence, it is an object to provide a sensor of the type mentioned initially that avoids this problem.

In order to prevent a buckling of the membrane, a tensile coating is applied on the membrane, This coating leaves at least part, preferably all, of the active electronic components integrated on the semiconductor device uncovered. As it has been found, the coating can otherwise lead to a change or degradation of the function of these components because it affects the electronic parameters of the semiconductor. Preferably, all active electronic components are therefore left uncovered by the tensile coating.

The tensile coating covers preferably the whole membrane. In order to exert a pulling force suited for tightening the membrane, it should preferably extend beyond the membrane somewhat at least at two opposite sides.

The invention is especially suited for being applied in integrated flow sensors.

BRIEF DESCRIPTION OF THE DRAWINGS

Further embodiments, advantages and applications of the invention are given in the dependent claims as well as in the now following description making reference to the drawings, wherein:

WAYS TO CARRY OUT THE INVENTION

Figure 1:
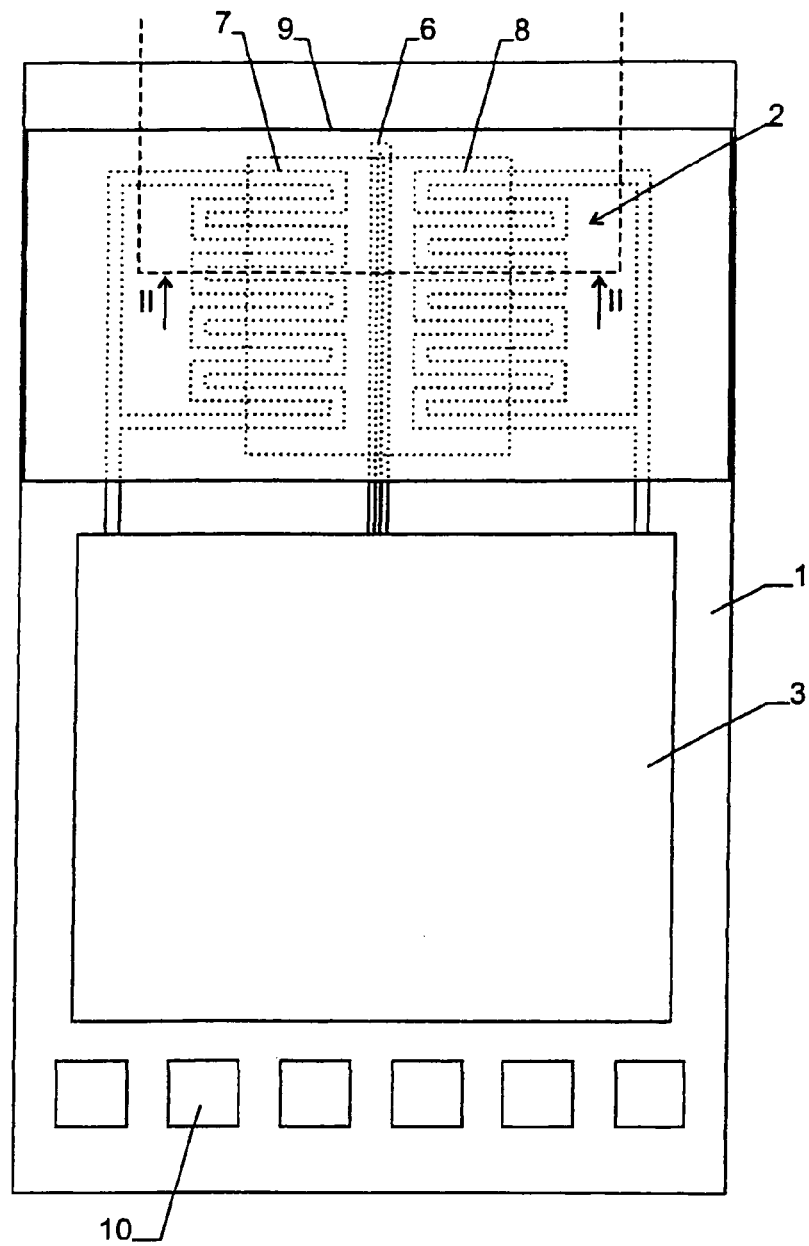
FIG. 1 is a top view of a flow sensor, wherein the components that lie below the tensile coating are shown in dashed lines.
Figure 2:
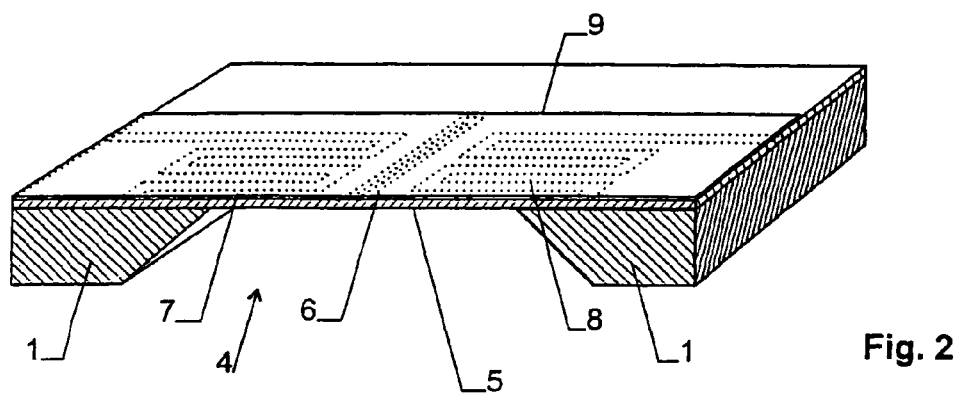
FIG. 2 is a sectional view along line II-II of FIG. 1.

In FIGS. 1 and 2 an embodiment of the invention in the form of a flow sensor is shown. It comprises a semiconductor device 1, onto which a measuring element 2 and a circuit 3 are integrated.

In semiconductor device 1 an opening or recess 4 has been etched out, which is covered by a thin membrane 5.

A heating 6 is arranged on membrane 5. Two meandering thermopiles 7, 8 are provided symmetrically to heating 6, which act as temperature sensors. The orientation of the thermopiles 7, 8 and the heating 6 in respect to the flow direction of the medium to be measured is such that the medium first flows over first thermopile 7, then over heating 6, and finally over second thermopile 8.

The measuring element 2 is covered by a tensile coating 9, which is under tensile stress and extends beyond membrane 5 on all sides or at least on two opposite sides of recess or opening 4. The overlap reaches at least sufficiently far in order to provide anchoring for the tensile coating 9 on semiconductor device 1 for receiving the tension. The tensile stress in tensile coating 9 is at least sufficiently large to exceed a compressive stress in membrane 5, which leads to a total tensile stress. Coating 9 therefore keeps membrane 5 tight and prevents or counteracts a buckling thereof.

Tensile coating 9 can e.g. consist of a silicon oxide, silicon nitride or a polymer, in particular polyimide. Other possible materials are e.g. "Diamond Like Carbon" (DLC), polyether ether ketone (PEEK) or silicon. Silicon nitride has been found to be especially suited.

The tensile stress in coating 9 can be controlled by means of known methods by suitable choice of the manufacturing parameters, see e.g. U. Münch et al., "Industrial Fabrication Technology for CMOS Infrared Sensor Arrays" in "Transducers '97, International conference on Solid State Sensors and Actuators", IEEE 1997, where it is described how, by suitable selection of the low frequency power and the pressure in a PECVD method, the tensile stress of a layer of silicon oxide nitride can be adjusted.

A coating under tensile stress can also be manufactured by applying a coating material with a higher thermal expansion coefficient than silicon at elevated temperature onto semiconductor device 1. When cooling the device down, a tensile coating is generated inevitably.

The tensile stress should be chosen sufficiently large such that it can compensate a possible compressive stress in membrane 5. Preferably, the tensile stress is at least 100 MPa.

Photolithographic methods can be used for structuring or defining the spatial extension of tensile coating 9. A shadow mask can be used as well, or a lift-off technique can be applied, where an additional material layer below coating 9 is dissolved wherever coating 9 is to be removed.

The general principle of operation of measuring element 2 is described in detail in "Scaling of Thermal CMOS Gas Flow Microsensors: Experiment and Simulation" by F. Mayer et al., in Proc. IEEE Micro Electro Mechanical Systems, (IEEE, 1996), pp. 116ff. In particular, the temperatures over the thermopiles 7, 8 are measured for determining the mass flow over the sensor. The difference of these temperatures is a function of the mass flow.

Circuit 3, which can e.g. be implemented in CMOS technology, is provided for the corresponding processing of the signals from the thermopiles 7, 8. It comprises amplifiers, A/D-converters with reference voltage sources, and a digital processing circuit with interface. For connecting circuit 3 with the exterior world, contact pads 10 are provided.

As can be seen from FIG. 1, tensile coating 9 only covers a part of semiconductor device 1, namely the part that is exposed to the medium to be measured. In particular, tensile coating 9 does not extend over circuit 3. Experiments have shown than mechanical stress caused by the tensile coating can affect the electrical parameters of semiconductor device 1, which can e.g. lead to a change of the properties of transistors, reference voltage sources, and other devices, in particular of active components and resistors. By not laying tensile coating 9 over these components, such a degradation can be avoided. This simplifies the manufacturing process because the known electrical parameters of the semiconductor can be used for modelling the circuit.

Due to tensile coating 9 a buckling of the membrane can, as mentioned, be prevented. It also prevents or reduces a bending of membrane 5 if a pressure difference is applied over the same.

In the above example, the invention has been described for a flow detector, but it can also be used in other applications:

A membrane 5 of the type shown in FIG. 2 can also be used in pressure sensors, where a pressure difference to be measured is applied over the membrane. In this case, tensile coating 9 can also be used for changing the sensitivity of the sensor. The higher the tensile stress and the elastic modulus in coating 9, the lower the sensitivity becomes.

Further, the tensile coating 9 can be used for other types of sensors where a membrane of the type of FIG. 2 is used, e.g. for infrared sensors.

The tensile coating 9 can even be an active part of the sensor. Thus, it may consist of a material the dielectric or electric properties of which vary depending on a parameter to be measured. In a humidity sensor, a polymeric tensile coating, the dielectric constant or conductivity of which varies depending on current humidity, may e.g. be used. In a substance detector, tensile coating 9 can e.g. undergo chemical reactions with the substance to be measured, or its chemical potential or work function can change. Also the optical properties of the tensile coating can depend on a parameter to be measured.

The tensile coating 9 can also have further functions. For example, it can in particular form an insulating layer that separates the components arranged on the membrane from the medium to be measured. It can e.g. serve as a passivation that prevents a damage of the components by acids or water.

The layers of membrane 5 can be layers that are a result of the process for manufacturing circuit 3. Therefore, the mechanical properties, and in particular the tensility of these layers cannot be chosen freely. The additional tensile coating 9 allows it, however, to keep membrane 5 taut and to control its flexing properties independently from the used process.

In the above described example the tensile coating is lying over membrane 5 as well as on the components arranged on the membrane. It can, however, also be arranged below membrane 5 or as a layer within membrane 5.

In addition, electronic semiconductor components are often provided with a protective layer. This protective layer consists preferably of silicon nitride ($Si_3N_4$) and serves, in particular, for protecting the topmost metal layer from corrosion. In order to make the protective layer as tight as possible, it is, as a rule, compressive, i.e. it is under a compressive stress parallel to the semiconductor surface. In normal CMOS manufacturing processes it is applied to the device in a last step and covers the same substantially completely, with the exception of the contact pads 10.

Such a protective layer can counteract the effect of tensile layer 9. Hence, it is preferably structured such that it, at least, does not extend over membrane 5. For this purpose, it can be left away in a region of membrane 5 or it can be removed before applying the tensile coating.

Figure 3:
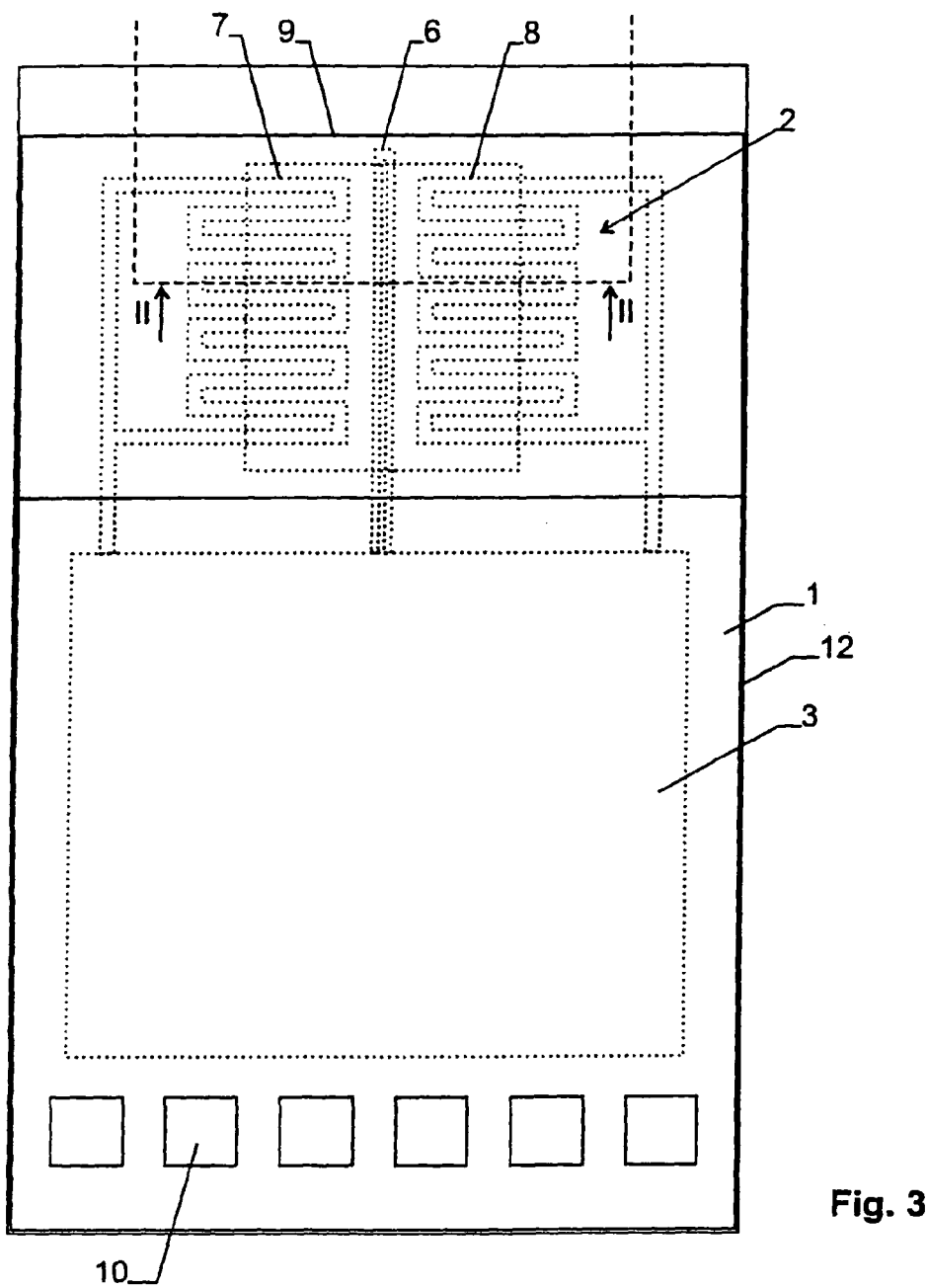
FIG. 3 is a top view of the flow sensor where an additional protective layer is shown in addition to the tensile coating.

A corresponding sensor is shown in FIG. 3. It comprises a protective layer 12, which is under compressive stress and covers and protects at least circuit 3.

The protective effect of protective layer 12 is, in general, better than the one of tensile coating 9 because the latter can tend to form holes and fractures because of its inherent tensile stress. Therefore, tensile coating 9 should not be applied directly on a metal layer (which corrodes easily).

Figure 4:
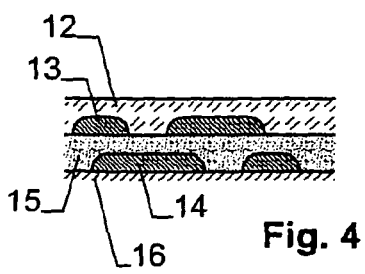
FIG. 4 is an example of a structure in a region of the protective layer.

As a rule, several metal layers are provided in normal CMOS devices, as it is shown in FIG. 4. In this example, the topmost metal layer 13 is covered by protective coating 12 and separated from the next to top metal layer 14 by means of a silicon oxide layer 15. Below the lower metal layer 14, further layers 16 may follow.

Figure 5:
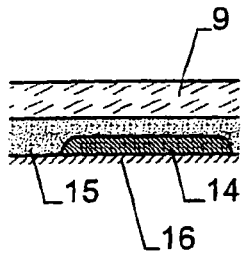
FIG. 5 is an example of a structure in a region of the tensile coating.

If protective layer 12 is replaced by tensile coating 9, topmost metal layer 13 should be omitted, as it is shown in FIG. 5. Hence, in the present case, no structures of topmost metal layer 13 should be provided in the area of coating 9. This ensures that, in the area of coating 9, all metal structures are protected by silicon oxide layer 15. Silicon oxide layer 15 therefore forms a separating layer between coating 9 and the metal structures of the device and protects the same from environmental influence.

As mentioned above, protective layer 12 can be omitted in the area of membrane 5 or it can be removed prior to applying tensile coating 9. In the latter case, protective layer 9 has to be etched off in the area of membrane 5. During this, it should, however, be avoided that silicon oxide layer 15, by means of which the structures of lower metal layer 14 are to be protected, is damaged.

As there are hardly any etching processes with a good selectivity between silicon oxide and silicon nitride, topmost metal layer 13 is preferably used as an etching stop when etching off protective layer 12. For this purpose, the latter is structured to extend over the whole membrane 5. Then the device is provided with coating 12. Now, coating 12 can be etched off in the area of the membrane by means of a first etching agent, wherein topmost metal layer 13 protects the next lower silicon nitride layer 15. Then topmost metal layer 13 can be removed in the area of membrane 5 by a metal specific second etching agent, again without impairing silicon oxide layer 14. Finally, coating 9 is applied to silicon oxide layer 14.

The rule according to which coating 9 should not lie directly on a metal structure must also be observed in the area of so-called "scribe lines". These comprise diffusion barriers ("seal rings") that are formed by omitting, in an area, all layers with the exception of the metal layers. If a scribe line is arranged below coating 9, silicon layer 15 should be left covering the seal ring.

FIGS. 6 through 9 show an example of the steps for applying tensile coating 9. It most be noted that the thickness of the various layers in these figures are not drawn to scale.

Prior to applying tensile coating 9, various layers, e.g. as mentioned above, were applied to the substrate of device 1 in a standard CMOS manufacturing process. Typical examples of such layers are, starting from the substrate:
- a silicon oxide layer 20,
- a structured polysilicon layer 21 (or several polysilicon layers separated by silicon oxide layers), which may e.g. be a conventional polysilicon layer or a silicided polysilicon layer,
- a silicon oxide layer 22,
- a first structured metal layer 23,
- a silicon oxide layer 24,
- a second structured metal layer 25,
- the protective layer 12, which may e.g. consist of a silicon oxide layer topped by a silicon nitride layer.

Figure 6:
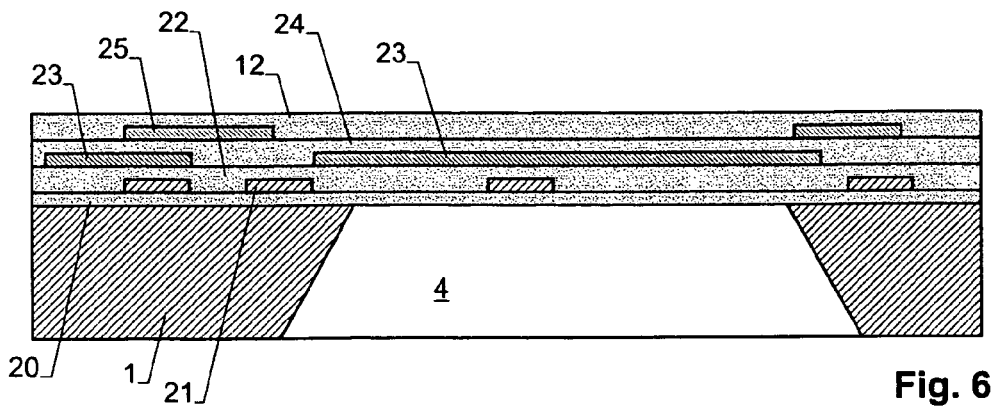
FIG. 6 is a sectional view of an embodiment of the invention before CMOS post processing.

The example of FIG. 6 has two metal layers 23, 25. This number may very depending on device complexity and CMOS manufacturing process. Similarly, the number of polysilicon layers can vary. Each of the conductive metal or polysilicon layers can, in turn, be a multilayer structure comprising a several adjoined conducting and/or semiconducting material layers.

The insulating layers between the conducting layers can be at least in part of any other suitable material, such as silicon nitride, instead of silicon oxide, or they can in turn consist of several, different layers. Usually, all of these layers are slightly compressive.

One of the conducting layers, in the embodiment of FIG. 6 bottommost metal layer 23, has been structured to extend over the whole opening or recess 4, with no other conducting layers above it.

Figure 7:
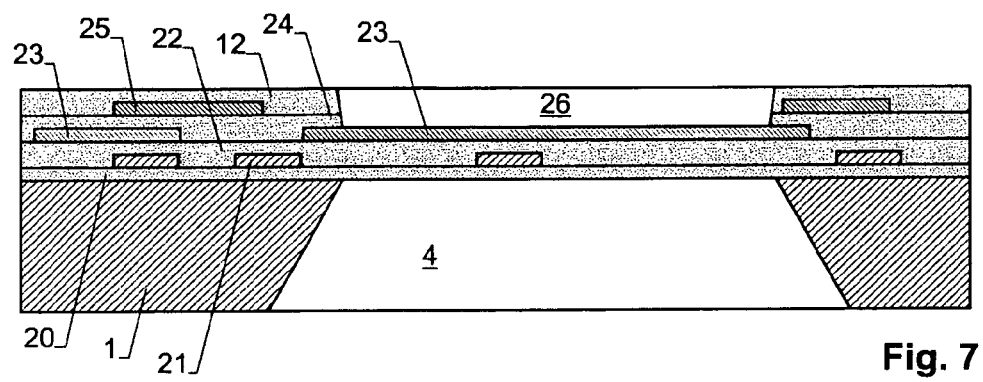
FIG. 7 shows a first post processing step.
Figure 8:
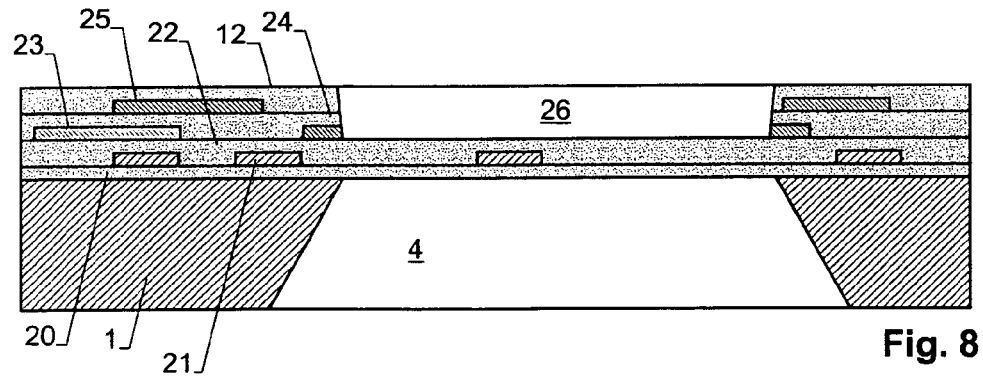
FIG. 8 shows a second post processing step.
Figure 9:
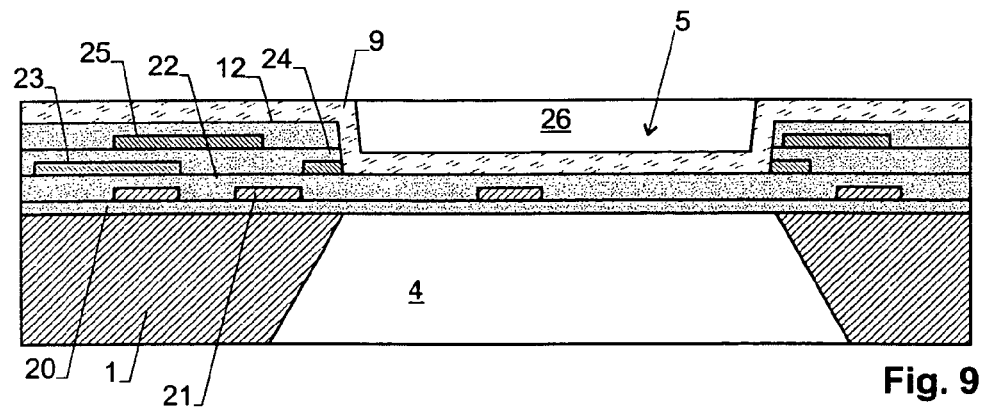
FIG. 9 shows a third post processing step.

In a first post processing step, as illustrated in FIG. 7, a region 26 is etched off above recess or opening 4 using a first etching agent as described above. Metal layer 23 acts as an etch stop. For this reason, metal layer 23 is also called the "etch stop conducting layer".

In a second post processing step, the etch stop conducting layer (metal layer 23) is etched off with a second etching agent, using the next lower insulating layer (namely silicon oxide layer 22) as an further etch stop.

In a third post processing step, tensile coating 9 is applied as described above.

In the embodiment of FIGS. 6 through 9, polysilicon layer 21 remains available below the etch stop conducting layer for creating conductor structures in the region of membrane 5. If a more complex, two-layer conductor structure is required on membrane 5, a next upper conducting layer (instead of metal layer 23) has to be used as etch stop conducting layer in the first post processing step described above.

Alternatively, no polysilicon layer, or any number of polysilicon and/or metal layers may be present below the etch stop conducting layer.

The etch stop conducting layer is not necessarily one of the metal layers, but may also be one of the polysilicon layers.

However, in an advantageous embodiment, it is not the topmost conducting layer of the CMOS process that is used as etch stop conducting layer in the first post processing step, but rather the lowest conducting layer that is not required for manufacturing conducting structures in membrane 5. Any further conducting layers between the etch stop conducting layer and protective layer 9 must be structures thus that they do not extend over recess or opening 4 in order to allow all insulating layers in region 26 to be removed in a single etching step. In other words, prior to post processing, the etch stop conducting layer should be the topmost conducting layer in the region of membrane 5.

This allows to remove, in a simple post processing procedure, all the insulating layers from the CMOS manufacturing process that are not used in the region of membrane 5, thereby minimizing the compressive forces acting in this region.

While the present application describes preferred embodiments of the invention, it is to be distinctly pointed out that the invention is not limited thereto and can also be carried out in different manner within the scope of the following claims.

The invention claimed is:

1. A method for producing a sensor having a semiconductor device on which a measuring element and a circuit with active electronic components are integrated, the measuring element being arranged on a membrane above an opening or recess of the semiconductor device, said method comprising the steps of
   - applying a compressive protective layer on the semiconductor device,
   - removing the compressive protective layer at least in a region of the membrane and
   - applying a tensile coating at least in the region of the membrane.

2. The method of claim 1 wherein, below the protective layer, a topmost metal layer is arranged and wherein, for removing the protective layer, the protective layer is etched off by a first etching agent, wherein the topmost metal layer acts as an etch stop, whereupon the topmost metal layer is removed by a second etching agent.

3. The method of claim 1 wherein the step of removing the compressive protective layer comprises etching.

4. The method of claim 3 wherein a metal layer below said compressive protective layer is used as an etch stop while etching off said compressive protective layer.

5. The method of claim 4 further comprising the step of etching off said metal layer after etching of said protective layer.

6. The method of claim 4 wherein said metal layer is structured to extend over the whole membrane.

7. The method of claim 3 further comprising the step of applying several metal layers below said protective layer.

8. The method of claim 1 further comprising the steps of
   - applying at least one scribe line to said semiconductor device, and
   - applying said tensile coating on a seal ring of said scribe line with a separating layer between said seal ring and said tensile coating.

9. The method of claim 8 wherein said separating layer is a silicon oxide layer.

10. The method of claim 1 further comprising the step of providing a separating layer between said tensile coating and any metal structures of said semiconductor device.

11. A method for producing a sensor having a semiconductor device on which a measuring element and a circuit with active electronic components are integrated, the measuring element being arranged on a membrane above an opening or recess of the semiconductor device, said method comprising the steps of
   - applying at least one metal layer on the semiconductor device,
   - applying at least one compressive layer on the semiconductor device,
   - removing the compressive layer at least in a region of the membrane by etching said compressive layer off and using said metal layer as an etch stop and applying a tensile coating at least in the region of the membrane.

12. The method of claim 1 wherein, below the protective layer, a conducting layer extends over said opening or recess and wherein, for removing the protective layer, the protective layer is etched off by a first etching agent, wherein the conducting layer acts as an etch stop conducting layer, whereupon the etch stop conducting layer is removed by a second etching agent.

13. The method of claim 12 wherein at least one further conducting layer is arranged between said etch stop conducting layer and said protective layer, wherein said further conducting layer does not extend over said recess or opening.

14. The method of claim 12 wherein at least one further conducting layer is arranged below said etch stop conducting layer and is used for manufacturing conductive structures in said membrane.

* * * * *